Patented Mar. 1, 1932

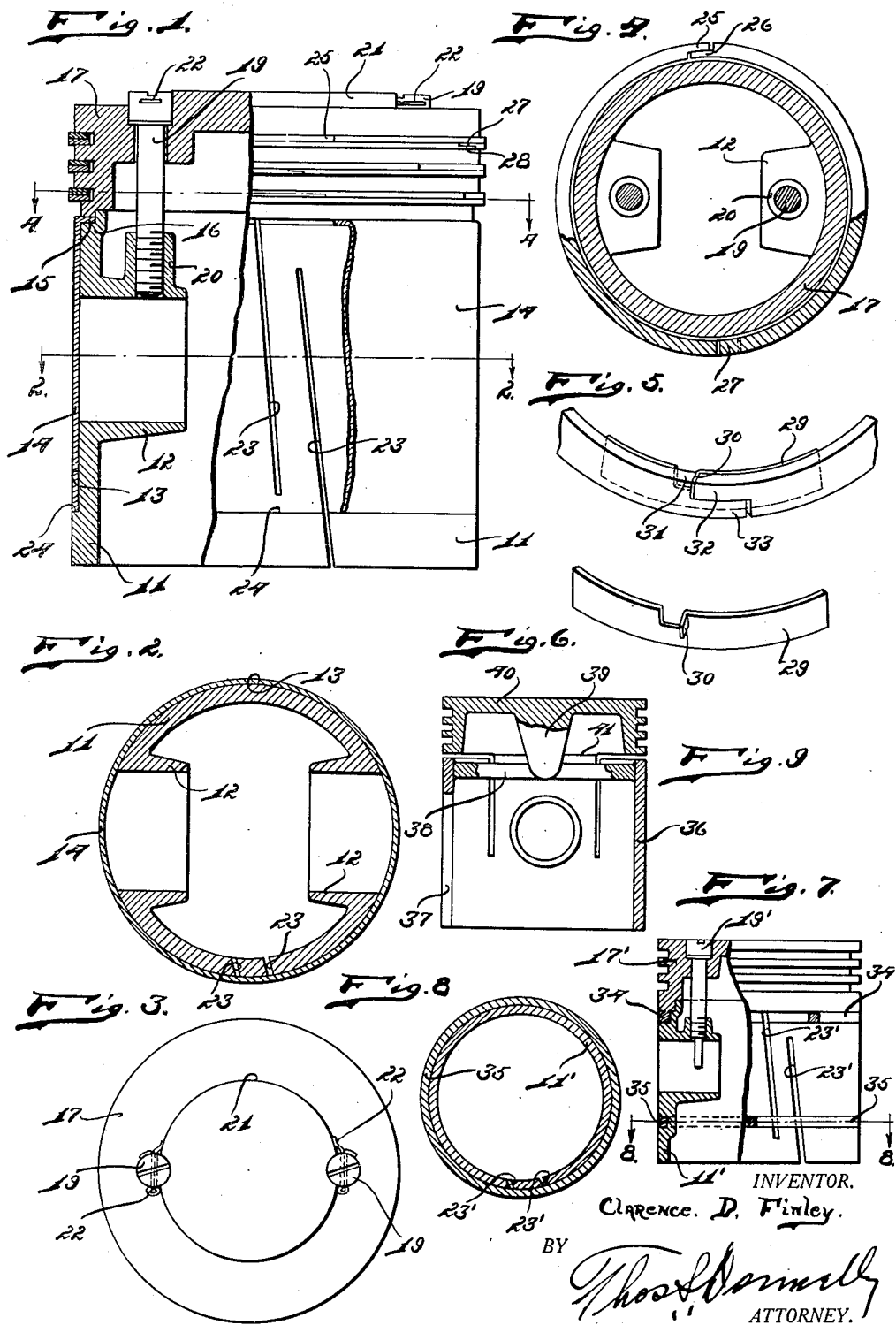

1,847,756

UNITED STATES PATENT OFFICE

CLARENCE D. FINLEY, OF DETROIT, MICHIGAN

PISTON AND PISTON RING THEREFOR

Application filed June 25, 1928, Serial No. 287,909. Renewed July 29, 1931.

My invention relates to a new and useful improvement in a piston and piston rings therefor, and has for its object the provision of a piston whereby the main body of the piston may be made from one material and the contacting surface of the skirt or guide portion thereof made from another material.

Another object of the invention is to provide a piston in which the weight is reduced to a minimum and the most efficient contacting surface provided.

Another object of the invention is the provision of a piston having a skirt or guide portion formed from one kind of material and provided with an outer layer of other material for engaging the cylinder walls.

Another object of the invention is the provision in a piston of a piston ring whereby leakage of gases may be prevented and a maximum efficiency obtained.

Another object of the invention is the provision of a guide portion or skirt on a piston whereby the same may be reinforced, while at the same time, permitting freedom of expansion and contraction.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention with parts broken away and parts shown in section.

Fig. 2 is a sectional view taken on line 2—2 of Fig. 1.

Fig. 3 is a top plan view of Fig. 1.

Fig. 4 is a sectional view taken on line 4—4 of Fig. 1.

Fig. 5 is a fragmentary perspective view of a piston ring embodying the invention.

Fig. 6 is a perspective view of a sealing strip used with the piston ring.

Fig. 7 is a side elevational view of a modified form of the invention, with parts broken away and parts shown in section.

Fig. 8 is a sectional view taken on line 8—8 of Fig. 7.

Fig. 9 is a central vertical sectional view of a modified form of piston.

In the preferred form the skirt 11 is provided with a plurality of inwardly projecting bearing forming bosses 12 in which the wrist pin may engage. The periphery of the skirt 11 is recessed as at 13 and engaging in this recess is a sleeve 14 having a flange 15 at its upper end to engage the shoulder 16. The head or groove bearing portion 17 in which the piston rings 18 are located is detachable from the skirt and is secured thereto by means of screws 19 threaded into a projection 20 on the bosses 12. The upper surface of the head 17 is cut away as at 21 to provide a space for the reception of the cotter pins 22 which are projected through the heads of the screws 19 so as to prevent undue rotation thereof. As shown in Fig. 1 the head 17 engages the upper surface of the flange 15 so as to retain the sleeve 14 in position. The skirt 11 is provided with the diagonally extended slits 23 to facilitate expansion and contraction.

It is preferred to form the skirt 11 from one material such as aluminum or the like so that the piston will be sufficiently light. It is also intended to form the sleeve 14 from another metal such as cast iron so that the proper bearing or engagement surface will be present on the piston to produce the most efficient results.

It will be noted that the lower edge of the sleeve 14 engages the shoulder 24 which is formed in the periphery of the skirt 11 so that axial movement of the sleeve 14 on the skirt 11 is prevented.

The piston rings used in the invention are used in pairs, one pair being provided with tongues 25 and 26 positioned one inwardly of the other, and the other pair of rings being provided with tongues 27 and 28 which overlap one above the other. In this way a sealing effect is produced whereby an escape of gases around the ring or through the slit is prevented.

As shown in Fig. 5, I may also use a sealing strip 29 which has the tongue 30 punched therefrom and adapted to project outwardly between the portion 31 of the piston ring and the tongue 32, the tongue 32 lying above the tongue 33, the tongues 32 and 33 being similar to the tongues 27 and 28. By using the strip 29 the crevices at the meeting faces of the ring ends are securely sealed so that escape of gases therethrough is prevented.

In the forms shown in Fig. 7 and Fig. 8 I have provided a skirt 11' having cast iron rings 34 and 35 embedded in peripheral grooves formed in the skirt, these cast iron rings serving as engagement surfaces for engaging the inner walls of the cylinder with which used, thus affording the cast iron bearing against the cylinder walls, while at the same time, maintaining the skirt 11' sufficiently light for all purposes.

These rings may also be set in from the periphery sufficiently to clear the cylinder walls and thus they will serve only to control the expansion and contraction of the skirt.

Furthermore, the presence of the cast iron rings, while permitting freedom of expansion and contraction of the skirt which is facilitated by the slits 23', will also serve to reinforce this skirt. The head 17' is secured by the screw 19', this screw having an extension 19'' for engaging in a registering opening formed in the wrist pin.

In Fig. 9 I have shown a skirt 36 which is slitted as at 37. Extending diametrically of the skirt 36, adjacent the upper end, is a reinforcing rib 38, welded to which is the lug 39 which projects inwardly from the head 40, this head 40 being free from contact with the skirt 36, saving through the lug 39 and at the downwardly turned portion 41.

The cast iron rings or the sleeve, as well as the rib 38 and the skirt 11, are preferably made from a metal of the same co-efficient of expansion as the cylinder walls or of a metal which is less effected by the heat.

With a piston formed in this manner the skirt is reinforced, while at the same time, permitted the maximum freedom of expansion and contraction.

While I have illustrated and described the preferred form of my invention, I do not wish to limit myself to the precise details of structure shown, but desire to avail myself of such variations and modifications as come within the scope of the appended claim.

Having thus described my invention what I claim as new and desire to secure by Letters Patent is:

In combination with a split piston ring having overlapping tongues: a separable strip positioned behind said piston ring at the split; and an outwardly projecting tongue on said strip engaging between meeting edges of said ring said tongue being punched from one edge of said strip intermediate its ends.

In testimony whereof I have signed the foregoing specification.

CLARENCE D. FINLEY.